United States Patent
Zwolinski et al.

(10) Patent No.: US 7,356,967 B2
(45) Date of Patent: Apr. 15, 2008

(54) WEATHERSEAL HAVING A CURVILINEAR POLYMERIC BACKBONE

(75) Inventors: David T. Zwolinski, Maryville, TN (US); Kevin Willett, Rockford, TX (US)

(73) Assignee: Schlegel Corporation, New York, NY (US)

( * ) Notice: Subject to any disclaimer, the term of this patent is extended or adjusted under 35 U.S.C. 154(b) by 0 days.

(21) Appl. No.: 11/420,430

(22) Filed: May 25, 2006

(65) Prior Publication Data

US 2006/0207186 A1  Sep. 21, 2006

Related U.S. Application Data

(63) Continuation of application No. 10/688,098, filed on Oct. 17, 2003, now abandoned.

(51) Int. Cl.
  *E06B 7/16* (2006.01)
(52) U.S. Cl. .................. 49/440; 49/490.1; 49/441; 277/921
(58) Field of Classification Search .......... 49/440, 49/441, 414, 475.1, 490.1, 377; 277/921, 277/641, 642, 644
See application file for complete search history.

(56) References Cited

U.S. PATENT DOCUMENTS

| | | | |
|---|---|---|---|
| 2,255,936 A | * | 9/1941 | Mayer .................... 49/429 |
| 3,165,793 A | * | 1/1965 | Lynch .................... 49/479.1 |
| 4,472,469 A | * | 9/1984 | Thies ..................... 428/122 |
| 5,003,792 A | * | 4/1991 | Mesnel et al. ........... 49/475.1 |
| 5,343,609 A | | 9/1994 | McManus |
| 6,023,888 A | | 2/2000 | Dover |
| 6,070,364 A | | 6/2000 | Berry |
| 2004/0060242 A1 | * | 4/2004 | Coldre et al. ............ 49/490.1 |
| 2004/0239053 A1 | * | 12/2004 | Rowe et al. ............. 277/650 |

FOREIGN PATENT DOCUMENTS

| | | | |
|---|---|---|---|
| DE | 32 02 772 | * | 8/1983 |
| EP | 0 367 731 | * | 9/1990 |
| EP | 0 448 270 | * | 9/1991 |
| GB | 1109513 | | 4/1968 |
| WO | WO 03/093044 | | 11/2003 |
| WO | WO 2004/108458 | | 12/2004 |

* cited by examiner

*Primary Examiner*—Gregory J. Strimbu
(74) *Attorney, Agent, or Firm*—Harter Secrest & Emery LLP; Brian B. Shaw, Esq.; Stephen B. Selai, Esq.

(57) ABSTRACT

A weatherseal has a backbone, which is curvilinear in cross section to define a flange engaging channel and a window receiving channel, wherein the backbone is free of structural metal. The backbone is sufficiently curvilinear to sufficiently distribute stress loading within the cross section to allow unsupported lengths of the weatherseal to operably retain, locate and direct the glass panel. The flange engaging channel can include an arcuate closed end.

29 Claims, 4 Drawing Sheets

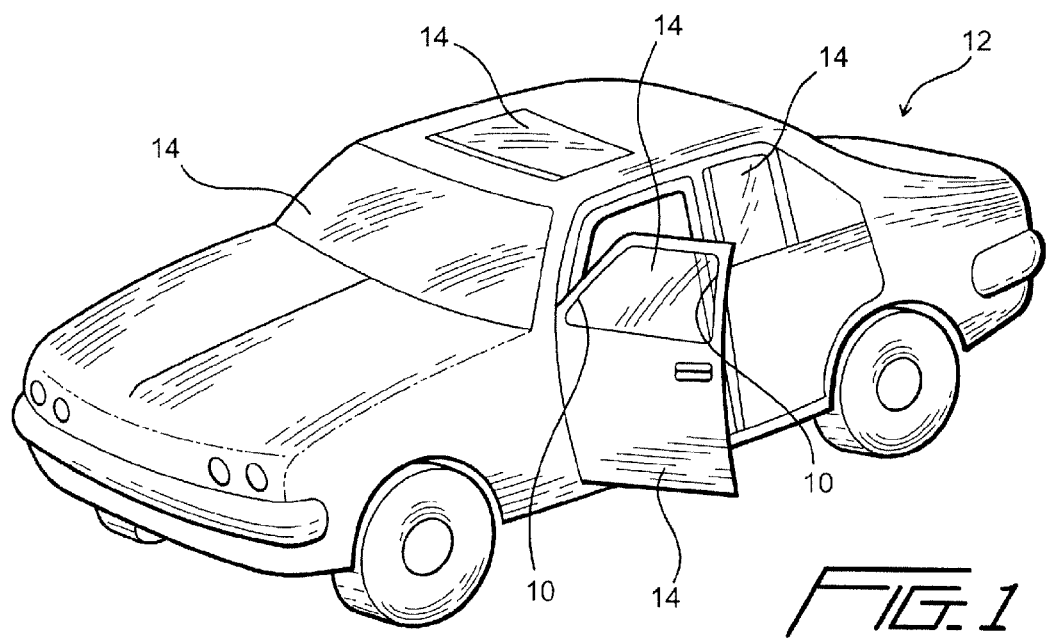
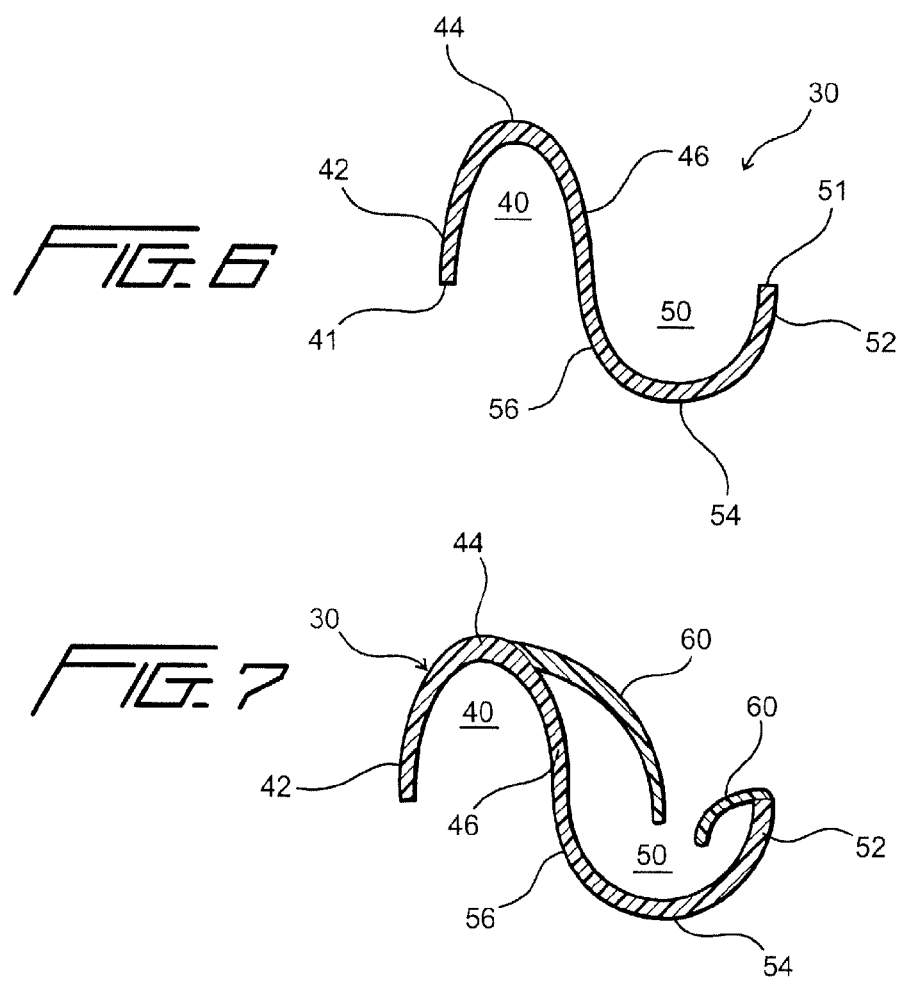

WEATHERSEAL HAVING A CURVILINEAR POLYMERIC BACKBONE

CROSS-REFERENCE TO RELATED APPLICATIONS

This application is a Continuation of U.S. application Ser. No. 10/688,098, filed Oct. 17, 2003, under the same title, now abandoned, which is hereby incorporated by reference.

STATEMENT REGARDING FEDERALLY SPONSORED RESEARCH OR DEVELOPMENT

Not Applicable.

REFERENCE TO A "SEQUENCE LISTING"

Not Applicable.

BACKGROUND OF THE INVENTION

1. Field of the Invention

The present invention relates to weatherseals, and more particularly to a vehicular weatherseal having a sufficiently rigid curvilinear polymeric backbone to form a window channel guide along an unsupported length of the weatherseal and more particularly, to a polymeric backbone defining a curvilinear closed end of a glass receiving channel.

2. Description of Related Art

Weatherseals must perform a variety of functions including reducing environmental migration across a sealed interface. In addition to the traditional function of a weatherseal, current vehicular weatherseals may also be subject to further performance demands, such as weight minimization and conforming to complex window geometries.

U.S. Pat. Nos. 5,343,609, 6,023,888 and 6,070,364 disclose a combination door and window channel seal for sealing between a motor vehicle doorframe and the movable window glass panel. The channel seal is formed of straight channel legs and a straight base interconnected at corners.

The need exists for a weatherseal that can engage the flange of the vehicle as well as perform the required sealing functions, while reducing an overall weight of the weatherseal. The further need exists for a weatherseal that can readily be recycled without excessive cost at the end of the useful life of the vehicle. The need also exists for a weatherseal that can guide a panel, such as a window, along a complex three-dimensional curve. A need exists for a weatherseal that can provide the necessary rigidity and strength without requiring metal reinforcement or continuous engagement with a flange of the vehicle.

BRIEF SUMMARY OF THE INVENTION

The present invention provides a weatherseal having reduced weight, wherein the weatherseal is recyclable. In addition, the weatherseal defines a travel path or sealed interface which can extend about three axes without requiring either internal or external structural metal support.

The weatherseal includes a rigid polymeric backbone having a curvilinear cross sectional profile, wherein a sealing lip can be integrally formed with the backbone to provide a sealed interface and/or operably locate a glass panel within a glass receiving channel. The curvilinear cross sectional profile of the backbone is selected to minimize or avoid stress concentrations within the cross-sectional profile, thereby enhancing sustainable loading and operating forces. In addition, the curvilinear cross sectional profile allows the weatherseal to be formed without requiring structural metal. Further, the backbone provides sufficient rigidity to allow the weatherseal to span otherwise unsupported lengths.

In one configuration the backbone defines a flange engaging channel and an inverted window receiving channel, wherein a cross section of the window receiving channel is defined by a transition leg, an exterior leg and a curvilinear window channel closed end interconnecting the transition leg and the exterior leg. In a further configuration, the window channel closed end is sized to encompass a constant radius of curvature from the transition leg to the exterior leg. One configuration of the backbone provides a window channel closed end having an inner radius of curvature to wall thickness ratio between approximately 1.5 and 2.5.

The flange engaging channel, in cross section, is defined by the transition leg, an interior leg and a flange channel closed end, wherein the flange channel closed end can define a curvilinear cross section similar to the window receiving channel. Either or both of the window channel closed end and the flange channel closed end can be curvilinear with similar or different cross sections.

BRIEF DESCRIPTION OF THE SEVERAL VIEWS OF THE DRAWING(S)

FIG. 1 is a perspective view of a vehicle showing an operable location of the weatherseal.

FIG. 6 is a cross sectional view of an alternative backbone.

FIG. 7 is a cross sectional view of a further backbone.

DETAILED DESCRIPTION OF THE INVENTION

Referring to FIG. 1, a weatherseal 10 of the present invention can be employed in a motor vehicle 12. The weatherseal 10 can be used in locations for releasably and repeatedly engaging a panel 14. For purposes of description, the weatherseal 10 will be described in conjunction with the motor vehicle 12, however, it is understood the weatherseal is not limited to this particular application and can be employed along any interface which requires a resistance to environmental migration.

The term weatherseal includes but is not limited to extrusions, moldings, trim, trim pieces, edge pieces, weatherseals and seals. In the motor vehicle industry, the weatherseal 10 is suitable for use in many areas, including, but not limited to, door seals, roof rails, deck lids, trunk lids, back window seals, belt line seals, fixed window seals, windshields, front hood seals, hood to cowl seals, window seals, sun roof seals and window channel seals. In particular, the present weatherseal 10 finds particular application as a glass run channel, for engaging, guiding and sealing with a panel 14.

The panel 14 can be any of a variety of materials and does not limit the present invention. For example, the panel 14 can be glass, metal or a composite, which is painted, surface treated or bare. In the operating environment, the panel 14 can be brought repeatedly into and out of engagement with the weatherseal 10. The engagement of the panel 14 and the weatherseal 10 can result from motion of the panel relative to the weatherseal. Alternatively, the weatherseal 10 can be moved relative to the panel 14. Further, the weatherseal 10 and the panel 14 can be oriented to substantially preclude unintended movement. For example, the weatherseal 10 can be located about a fixed panel such as a front or rear window.

In certain configurations, the vehicle 12 includes a front door and a rear door. An A pillar extends between a windshield and the front door, a B pillar extends between the front door and the rear door and a C pillar extends between the rear door and a rear window.

Figure 2:
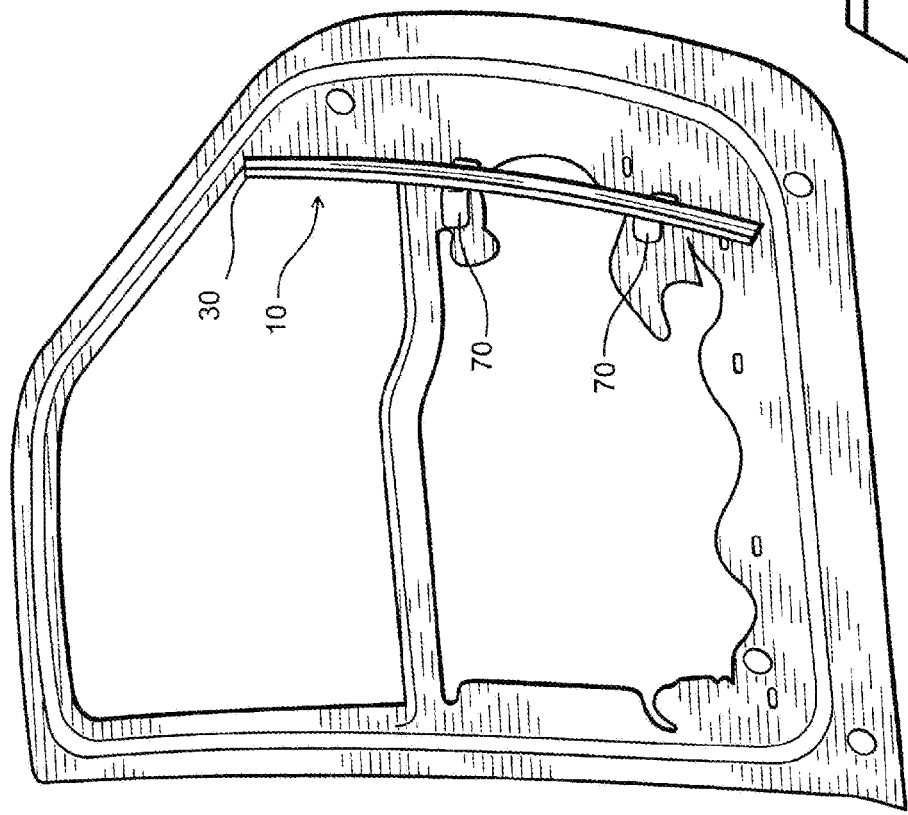
FIG. 2 is a side elevational view of a weatherseal assembly in a cut away vehicle door.
Figure 3:
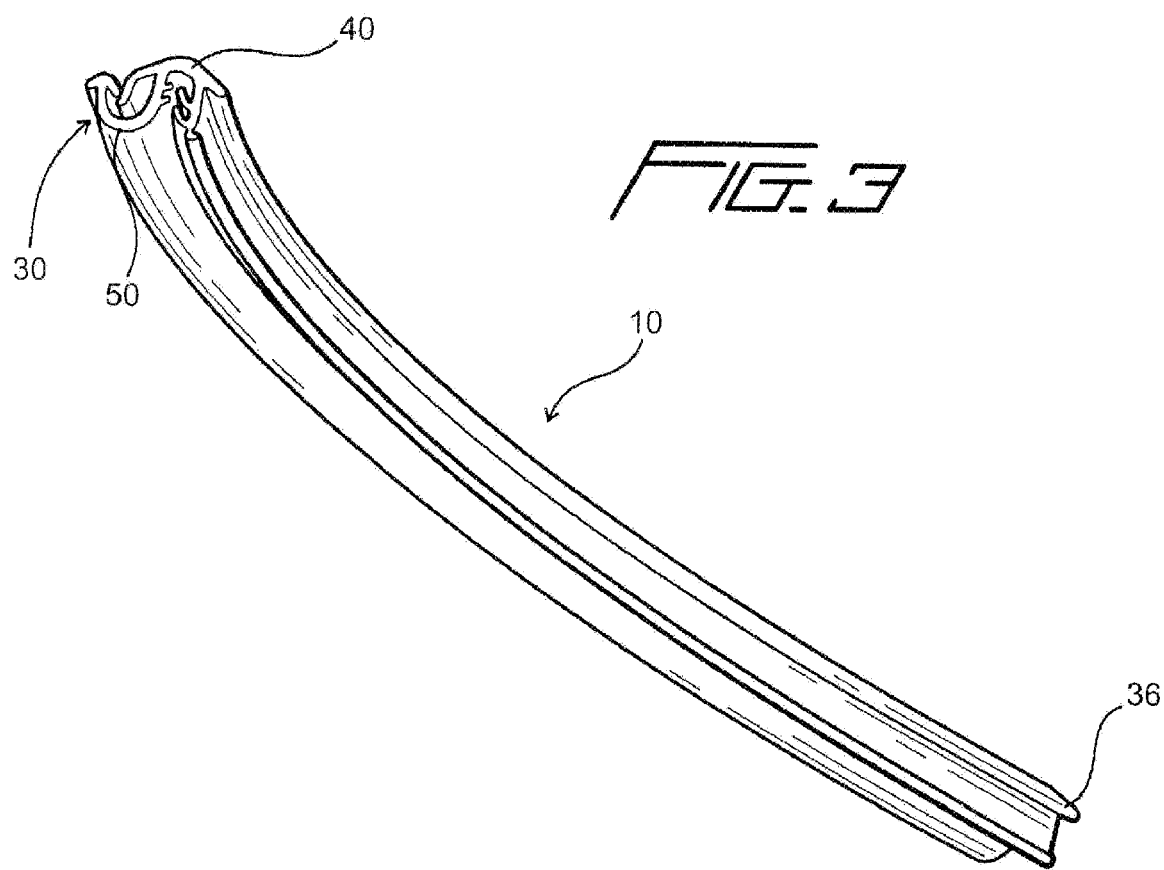
FIG. 3 is a perspective view of a length of the weatherseal.
Figure 4:
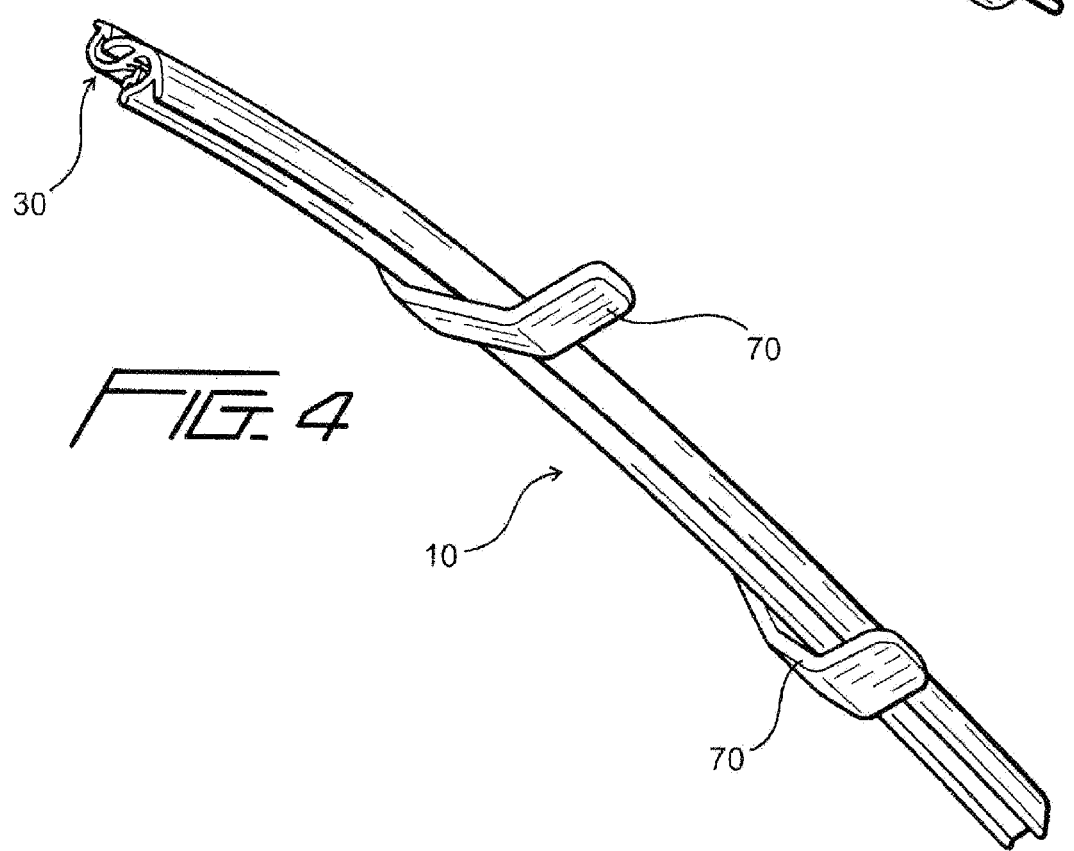
FIG. 4 is a perspective view of a length of the weatherseal having a pair of attachment tabs.

Although not limiting to the scope of the invention, it is anticipated the weatherseal 10 can be cooperatively employed with a vehicle 12 having a front door and a rear door, wherein a flange 16 (shown in FIG. 5) is adjacent to at least a portion of the operable location of the weatherseal. As seen in FIG. 2, in certain vehicle constructions, the flange 16 may not extend adjacent to all the portions of the panel 14 to be sealed or guided, and thus the weatherseal 10 must provide the necessary support structure.

For example, as seen in FIG. 2, the available length of the flange 16 for engaging the weatherseal 10 generally terminates at the belt line. As the window panel travels below the belt line, guidance of the window 14 must also extend below the belt line. Traditionally, a metal support channel is used to extend from the vehicle flange at the belt line to the bottom of the window travel path, wherein a metal retaining bracket connects the metal support channel to the vehicle door. The weatherseal below the belt line is traditionally carried by the metal support channel to define the window path.

Referring to FIGS. 2-7, the weatherseal 10 includes a backbone 30 having a generally curvilinear cross section, wherein the backbone allows the weatherseal to span an unsupported length of the window path such as, but not limited to, below the belt line. The weatherseal 10 can include at least one sealing lip 60.

As seen in FIGS. 3 and 5-7, the cross section of the backbone 30 defines a flange engaging channel 40 and an inverted window receiving channel 50 (often referred to as a glass run channel). The overall cross-sectional profile of the backbone 30 thus generally defines an S. The flange engaging channel 40, in cross section, is defined by an interior leg 42, a flange channel closed end 44 and a transition leg 46 projecting from the closed end 44. The window receiving channel 50, in cross section, is defined by the transition leg 46, a window channel closed end 54 and an exterior leg 52 projecting from the window channel closed end. Depending upon the length of the transition leg 46, the transition leg can form a common leg of the flange engaging channel 40 and the window receiving channel 50, or can define separate channel forming length corresponding to the respective interior leg 42 or exterior leg 52. The interior leg 42 includes a free end 41 and the exterior leg 52 includes a free end 51. Thus, the backbone 30 extends from the free end 41 of the interior leg 42 to the free end 51 of the exterior leg 52.

Figure 5:
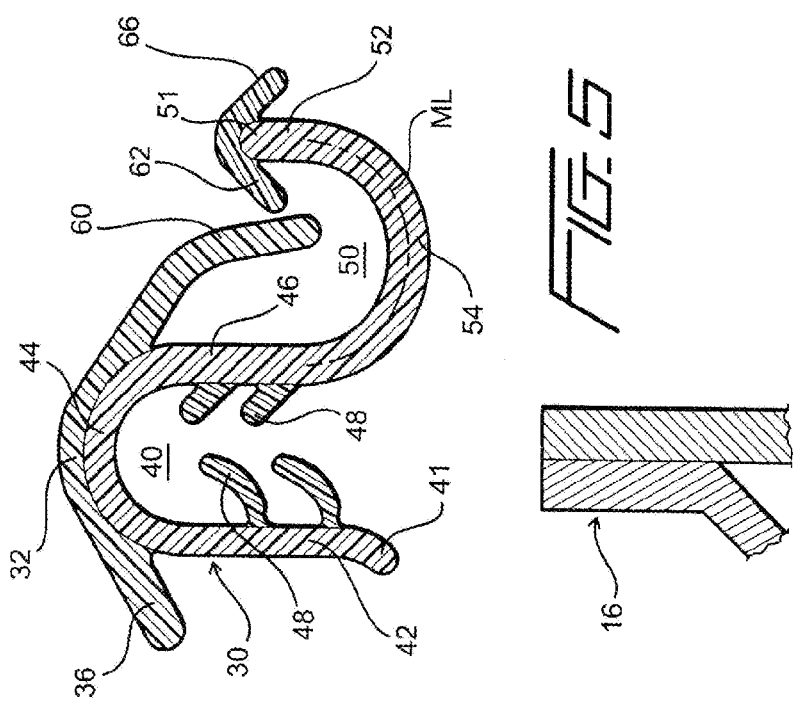
FIG. 5 is a cross sectional view of a backbone and associated flange.

Referring to FIG. 5, the cross section of the backbone 30 is generally defined by a medial line ML, wherein the medial line extends along the cross section of the backbone to be equally spaced from opposite sides of the backbone, exclusive of projecting lips and ridges. For purposes of description, as a portion of the cross section of the backbone 30 is set forth as defining a given shape, the corresponding medial line ML defines the given shape. Therefore, as the closed end 54 of the window receiving channel 50 has a curvilinear cross section, the medial line ML of the closed end 54 defines the curvilinear cross section.

The window channel closed end 54 provides an arcuate connection of the transition leg 46 to the exterior leg 52. The window channel closed end 54 can be defined by a constant radius of curvature, an ellipse, a parabola, a hyperbola, a catenary or other varying radius of curvature. Preferably, the curvilinear profile of the window channel closed end 54 reduces stress concentrations within the backbone 30 upon operable loading to less than those stress concentrations associated with a backbone having corners. In one configuration, the window channel closed end 54 is defined by a constant radius of curvature, wherein a central angle of at least 90° is formed, and the central angle is preferably from approximately 160° to 180°.

However, it is understood the window channel closed end 54 can effectively include a linear section, such as at the apex of the closed end. Typically, any such linear section is less than approximately 50%, and preferably less than 25% the length of the window channel closed end 54 extending from the exterior leg 52 to the transition leg 46. Any such linear sections are selected to reduce or minimize stress concentrations within the backbone 30, to below a level otherwise associated with corners. Further, it is contemplated that less than 50% of the length of the backbone cross section, from the free end 41 of the interior leg 42 to the free end 51 of the exterior leg 52, is straight. That is, at least 50% of the length of the backbone cross section is curvilinear The window channel closed end 54 can be defined as having an inner radius of curvature to wall thickness ratio of at least approximately 1, and typically from approximately 1.5 to 2.5.

It is also contemplated the window channel closed end 54 can encompass an arc of a constant radius from the transition leg 46 to the exterior leg 52. In one configuration, the radius of curvature is less than the arc length, and in certain configurations the radius of curvature can be less than approximately ⅓ the arc length.

Similarly, the flange channel closed end 44 can be curvilinear. As set forth in terms of the window channel closed end 54, the flange channel closed end can be any of the recited configurations. It is understood either of the closed ends 44 and 54 can be curvilinear.

In one configuration, both the window channel closed end 54 and the flange channel closed end 44 are curvilinear. In this configuration, the closed ends 44, 54 can be defined by similar or different curvilinear sections. That is, depending upon the thickness of the flange 16, the thickness of the window panel 14 and the operable spacing of the window panel from the flange, the flange channel closed end 44 can have one radius of curvature and the window channel closed end 54 can have a different second radius of curvature.

In a further configuration, the backbone 30 can define a continuously curvilinear cross section extending from the free end 41 of the interior leg 42 of the flange engaging channel 40 to the free end 51 of the exterior leg 52 of the window receiving channel 50. That is, the medial line ML of the backbone 30 defines a curvilinear path from the free end 41 of the interior leg 42 to the free end 51 of the exterior leg 52, wherein the medial line of the transition leg 46 includes an inflection point between the flange channel closed end 44 and the window channel closed end 54. The inflection point can be located within a linear or straight segment of the backbone cross section.

The radius of curvature throughout the backbone 30 may range from approximately 0.5 mm to 25 mm. Thus, the backbone 30 can be formed to define a cross section that is free of corners. The lack of corners reduces stress concentrations associated with corners, as well as enhancing subsequent processing to allow forming a panel travel path through three dimensions.

In contrast to prior window channel constructions, the backbone 30 is formed without structural metal. That is, the backbone 30 does not require a metal carrier or metal reinforcement for providing sufficient rigidity to perform the required functions. It has been found that sufficient rigid polymers or polymer compounds including polypropylene, nylon or thermosets with a flexural modulus typically of approximately 5.4 mega Pascals or greater can be employed to provide the necessary strength of the backbone 30.

The backbone 30 is formed of a polymeric material, and preferably a polymeric material having sufficient rigidity to perform the intended functions. A material that has been found suitable, is a structural grade polypropylene. It is understood that comparably rigid thermoset materials can be employed. However, use of thermoset materials requires additional processing steps for recycling of the thermoset materials. In contrast, thermoplastic materials can be readily remelted and reconfigured into subsequent products.

The backbone 30 can be formed from a number of different plastic materials, for example, thermoplastics and thermoplastic elastomers (TPEs). Depending on the hardness, TPEs are sometimes categorized as thermoplastics and sometimes as elastomers. For purposes of this invention, no such distinction will be made, and hard and soft grades of plastic will all be referred to as TPEs.

TPEs are commercially available in several different brands and types. Each type can be obtained in different grades having different properties such as, hardness, tensile strength, compression, elongation, thermal stability and colorability. Selection of the appropriate TPE for a particular application depends on a suitable combination for such properties Types of TPEs which are particularly useful are styrenic block co-polymers, rubber polyolefin blends, elastomeric alloys, thermoplastic alloys, thermoplastic elastomeric alloys, thermoplastic isomers, thermoplastic polyurethanes, polyvinyl chlorides and blends thereof.

Styrenic block copolymers are commercially available in many types (and grades within types), for example, Kraton® from Shell Chemical Co. is based on block copolymers of styrene with a diene or an olefin pair, ethylene-butylene. The diene can be isoprene or butadiene.

The rubber-polyolefin blends (or thermoplastic polyolefins (TPOs)) are blends of various polyolefins with ethylene-propylene rubber (EPR) or ethylene-propylene-diene-monomer (EPDM). Suitable polyolefins include polypropylene and various types of polyethylene. Copolymers of propylene and ethylene and blends of TPOs can also be used. TPOs are also useful as modifiers of other TPEs.

Alloying is an interactive combination of two or more materials to give a material having better properties than those of the corresponding blend. Thermoplastic alloys are available with properties enabling them to be painted. Thermoplastic elastomeric alloys and elastomeric alloys (EAs) are composed of synergistic mixtures of two or more polymers that have been treated to give them properties different from simple blends of the major constituents The two types of elastomeric alloys are melt processable rubbers (MPRs) and thermoplastic vulcanizates (TPVs).

EA-MPRs are a category of TPEs made of a highly plasticized, single phase combination of a chlorinated polyolefin, an ethylene-vinyl acetate copolymer and an acrylic ester mixture in which the rubber phase is highly crosslinked, for example, Alcryn® from E. I. du Pont Nemours, Inc. EA-TPVs are made of a rubber/plastic polymer mixture in which the rubber phase is fully crosslinked.

The plastic phase of a TPV is commonly a polyolefin (especially polypropylene), and the rubber phase is often an ethylene-propylene elastomer. A particularly useful TPV, suitable for windows seals, is formed from polypropylene and EPDM rubber and is commercially available in several grades as Santoprene® from Monsanto Chemical Co.

Thermoplastic polyurethanes (TPUs) are formed by copolymerization of diisocyanates with long-chain diols and short-chain diols. TPUs are available commercially in a number of types and grades, for example, Texin® from Mobay Corporation, Estane® from B. F. Goodrich Co., Pellethane® from Dow Chemical Corp. and Q-Thane® from K. J. Quinn and Co., Inc.

Polyvinyl chloride (PVC) based TPEs are also suitable for window seals and are available in different grades and blends with other TPEs and rubbers. P-Valloy is one such material available from GBIE (Gerry Bareich Import Export Inc.) of Canada.

Thermoplastic ionomers are polymers containing interchain ionic bonding which affords tough, durable, transparent thermoplastics, for example, Surlyn® from E. I. du Pont de Nemours, Inc.

The backbone 30 can be formed of a substantially rigid TPE. A rigid TPE, for example a polypropylene, preferably has a hardness in the range of 40 to 85, preferably 70, according to the Shore D scale.

It is understood, the backbone 30 can include metal in the form of a filler, trace amounts or colorants, and particularly those amounts that do not inhibit subsequent recycling of the polymer material. Such metal is in contrast to the structural metal sufficient to reinforce the backbone 30 or provide structural rigidity or integrity of the backbone (and the weatherseal 10).

In addition, as seen in FIGS. 6 and 7, the relative thickness along the cross section of the backbone 30 can vary depending upon the intended operating parameters of the weatherseal 10. For example, the thickness of the backbone 30 can be slightly increased along selected portions of the backbone.

The backbone 30 can also include a reinforcing member which enhances rigidity or stability in a single dimension. That is, the reinforcing member may provide stability along a longitudinal dimension of the backbone, while allowing the material of the backbone to define the rigidity in the transverse dimensions. Thus, the reinforcing member can take the form of an elongation reducing member, such as a metal or fiberglass cord or ribbon. The reinforcing member can thereby reduce elongation along a longitudinal dimension, without increasing stability of the backbone in a transverse dimension.

The degree of curvature within the cross section of the backbone 30 and the material of the backbone are selected to allow unsupported lengths of the weatherseal 10 to operably guide and retain the window panel 14 as the panel translates relative to the weatherseal as seen in FIG. 2. That is, the radius of curvature defined by the window channel closed end 54 is selected to substantially distribute loading and operating the forces across the backbone 30 while minimizing concentration of forces or stresses along the backbone. The distribution of loading and operating forces (and minimizing or preventing concentration of stresses) sufficiently enhances the strength of the backbone 30 so that unsupported lengths of the weatherseal 10 can function without secondary support. Thus, previously employed longitudinal metal retaining channels or longitudinal retaining brackets are not required. The backbone 30 is constructed to allow the weatherseal 10 to span lengths that are a plurality of times greater than a cross sectional dimension of the weatherseal. For example, it has been found that the weatherseal 10 can be operably located as a glass run channel, such as below the belt line, and span an unsupported distance of up to approximately 500 mm. Typical unsupported spans can range from approximately 150 mm to 250 mm The weatherseal 10 can extend along the vertical portions of the travel path of the window panel, as well as along the header portion. Alternatively, the weatherseal 10 can extend along either or both of a front edge and a rear edge of the window panel 14 below the belt line, or along a window path that is not adjacent a flange of the vehicle. The weatherseal 10 can thus guide the window panel 14 as the panel travels below the belt line (or along a path spaced from a vehicle flange).

The backbone 30 can be encompassed, partially covered or encapsulated by an additional polymeric material forming a surface layer 32. The surface layer can be formed of a variety of materials such as a TPE having a lower hardness than the backbone. However, in view of the benefits of reduced weight, encapsulation by the surface layer is optional.

The flange engaging channel 40 is preferably provided with one or more softer gripping fins 48 for firmly securing the backbone 30 to the vehicle 12, such as the flange 16. The gripping fins 48 can be formed by the variety of materials known in the art, such as thermosets or thermoplastics, including a sponge or foamed material of reduced density.

Referring to FIGS. 5 and 7, the sealing lip 60 projects from the backbone 30 into a portion of the window receiving channel 50. Although the sealing lip 60 can have a variety of configurations, a preferred configuration includes a primary sealing lip 60 extending from an outside surface of the closed end of the flange engaging channel 40 and a smaller secondary lip 62 extending from the exterior leg 52 of the window receiving channel 50. Although two sealing lips 60, 62 are shown, it is understood that additional sealing lips can be employed, as well as a single sealing lip. It is further understood that a portion of the sealing lips 60, 62 and the window receiving channel 50 which form a sealing interface with the window can include a friction reducing surface or slip coating. Such coatings include coextruded HDPE or modified HDPE, PTFE, as well as flock, and spray on coatings such as urethane.

The sealing lips 60, 62 can be any of a variety of polymeric materials including thermoplastics and thermosets. However, to enhance recyclability of the weatherseal 10, it has been found beneficial to employ a thermoplastic, such as a thermoplastic vulcanizate (TPV). The sealing lips 60, 62 gripping fins 48 and surface layer 32 (if employed) can be formed from a softer more resilient TPE, for example Santoprene®, having a hardness in the range of 40 to 90, preferably 70 according to the Shore A scale.

The hard and soft TPEs of the backbone 30 and sealing lips 60, 62 are readily processed and fabricated, for example, by extrusion or molding and are particularly amenable to coextrusion and molding of one or more TPEs of different durometer values. The TPEs are readily colored to match the vehicle either by incorporating pigment or by painting. Directly paintable TPE's have a high surface energy material blended into the base polymer to accept water based paints without any pretreatment. Various hardnesses of this material are available from Ferro Corporation.

The TPEs can be made with a high gloss finish, for example a Class A finish or a gloss of at least 60 numerical value when measured at a 60° angle with a gloss meter is readily obtained which is substantially higher than can be obtained with an EPDM rubber seal. It is desirable that the TPE meets the exterior weathering cycle per SAE J1960 with minimum change in color or gloss.

As seen in FIG. 5, the weatherseal 10 can include projecting trim lips. Specifically, an interior trim lip 36 can extend from the outside of the flange engaging channel 40. The interior trim lip 36 can be sized to contact or overlie a vehicle interior trim piece, such as but not limited to a header, liner or carpet.

Similarly, an exterior trim lip 66 can extend from the exterior leg 52 to contact or overlie an exterior vehicle trim piece.

Figure 9:
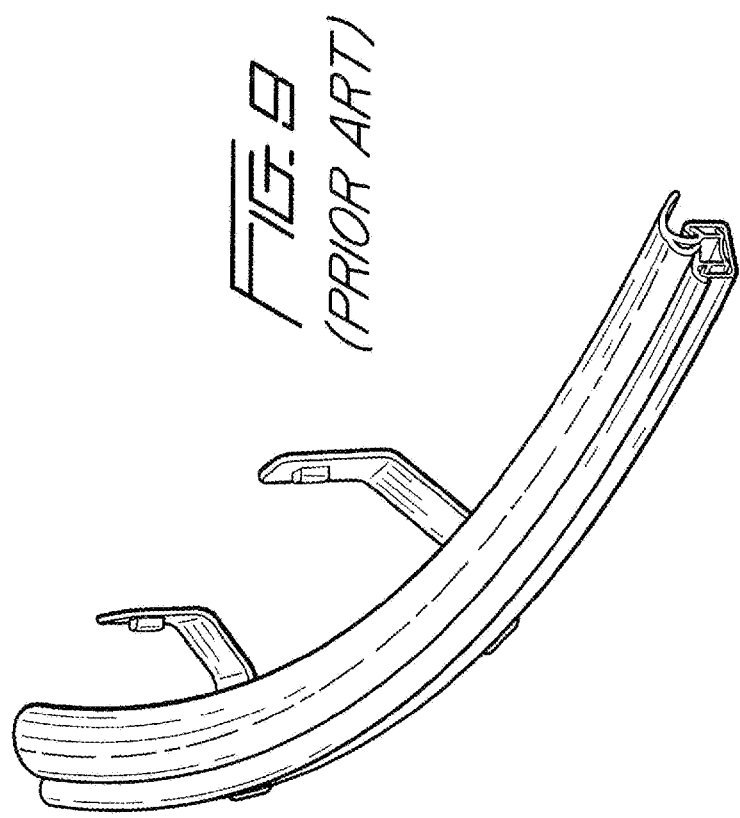
FIG. 9 is a perspective view of a length of a prior art weatherseal in the prior art retaining bracket of FIG. 8.
Figure 8:
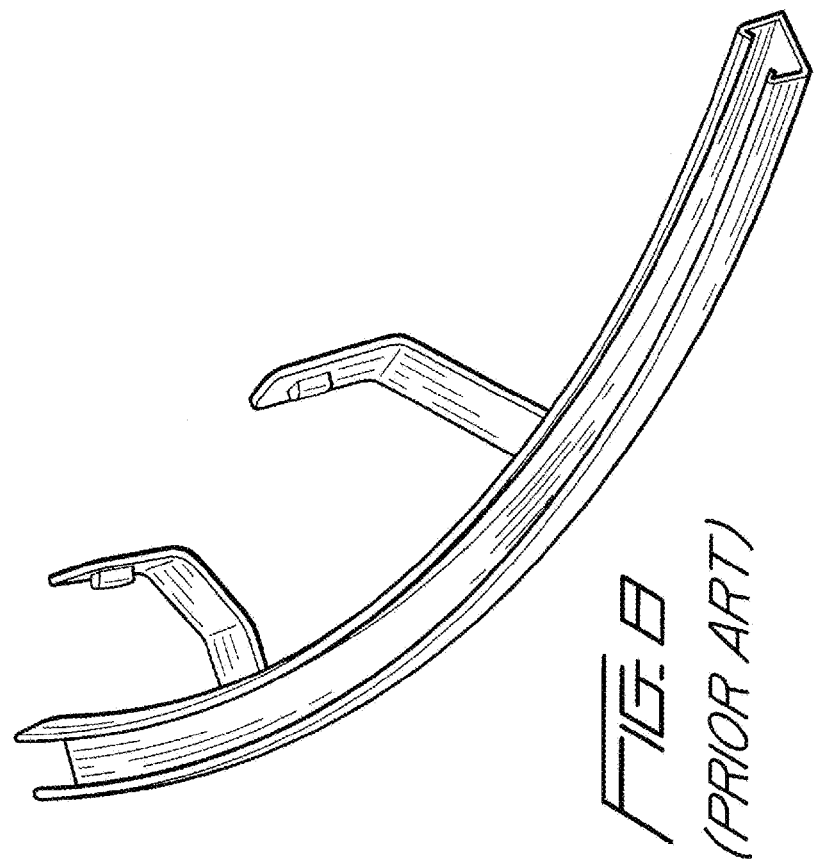
FIG. 8 is a perspective view of a length of a prior art retaining bracket.

Referring to FIGS. 8 and 9, in prior systems, a formed longitudinally extending metal retaining bracket was used to continuously support the weatherseal below the belt line, where the vehicle flange 16 is not available. The retaining bracket was in turn connected to the vehicle by attachment tabs. In contrast, the present weatherseal 10 does not require continuous longitudinal support or engagement with a longitudinally extending retaining bracket. As seen in FIG. 2, the weatherseal 10 can cooperate with one or more attachment tabs 70 extending generally transverse to the longitudinal dimension of the weatherseal to operably connect and locate the backbone 30 relative to the vehicle. The attachment tab 70 does not continuously extend along the entire length of the weatherseal 10 below the belt line. Specifically, the attachment tab 70 is sized to provide sufficient structural integrity for interconnection of the backbone 30 to the vehicle 12 at selected spaced apart points, rather than additionally supporting the lengths of the backbone not engaged with the flange. In addition, the attachment tab 70 can be spaced from the ends of the weatherseal 10. The backbone 30 can extend unsupported between spaced attachment tabs 70, or an attachment tab and the vehicle flange 16. In selected configurations, the attachment tab 70 can extend along less than 25% of the unsupported length of the backbone 30. It is understood in certain vehicle configurations, a single attachment tab 70 can be used to engage the backbone 30 with the vehicle 12. That is, the weatherseal 10 has sufficient rigidity to provide the necessary guide force to direct the window panel 14, without requiring continuous underlying support of the vehicle 12 or an external support, such as the metal retaining bracket. Thus, the weight of the longitudinal metal retaining bracket is removed from the vehicle 12.

The attachment tab 70 can be formed of a recyclable polymeric material having sufficient rigidity to operably interconnect the backbone 30 of the weatherseal 10 and the vehicle 12. The attachment tab 70 can be affixed to the backbone 30 by any of a variety of mechanisms including bonding, thermal welding, chemical fusion as well as mechanical fasteners In an alternative configuration, the attachment tab 70 can be formed of metal, and connected to the backbone 30 to allow removal from the backbone to facilitate subsequent recycling.

Although actual weight savings depends upon a number of factors, the weatherseal 10 can seal and guide the window panel 14 without requiring internal or external metal support, thereby reducing the weight of a weatherseal assembly by as much as approximately one kilogram. Thus, for a four door vehicle, the weatherseal 10 can eliminate between approximately four to five kilograms from the vehicle 12.

Manufacture

The weatherseal 10 is formed by extruding lengths of the backbone 30, wherein the sealing lips 60 are simultaneously extruded, coextruded or extruded with the backbone to intimately bond to the backbone 30 and preclude nondestructive separation. While it is preferable the materials are selected such that sufficient bonding is obtained by the heat during formation, it is understood that adhesives can be used to supplement or augment the construction.

Typically, the backbone 30 will be formed of a single composition exhibiting a single hardness. However, it is understood the backbone 30 can be formed of different materials having different hardness. Further, the backbone 30 is typically formed of a single piece of material, thus providing a monolithic body.

Further, in those configurations having a constant cross sectional thickness and a constant radius of curvature, the extrusion process can experience enhanced consistency. That is, a relatively constant wall thickness across the cross section of the backbone 30 increases the stability of the extrusion.

After formation, the weatherseal 10 can be locally or entirely heated to a sufficient temperature to allow deformation of the backbone 30 to allow the flange engaging channel 40 and the window receiving channel 50 to define a path extending along three dimensions The heat forming of the weatherseal 10 can be accomplished by selectively heating at least portions of the weatherseal and passing the heated weatherseal through rollers; heating the weatherseal and employing a jig or employing a heated formed cavity.

It has been found that the continuously curvilinear profile distributes stress loading throughout the profile thereby allowing the profile to be formed of a polymeric material without requiring a metal reinforcement.

As it is contemplated the attachment tabs 70 can be mechanically, chemically, thermally, or ultrasonically welded or bonded to the lower portions of the weatherseal 10 (such as within the door frame), the entire weatherseal can be formed of thermoplastic material, and thereby be readily recyclable.

While the invention has been described in conjunction with specific embodiments thereof, it is evident that many alternatives, modifications, and variations will be apparent to those skilled in the art in light of the foregoing description. Accordingly, the present invention is intended to embrace all such alternatives, modifications, and variations as fall within the spirit and broad scope of the appended claims.

The invention claimed is:

1. A vehicular weatherseal for receiving a portion of a glass panel, the weatherseal comprising a rigid polymeric backbone free of structural metal, the backbone having a flange engaging channel and a window receiving channel, the flange engaging channel and the window receiving channel having substantially the same rigidity, the window receiving channel being inverted relative to the flange engaging channel and having a window channel closed end, the window channel closed end sized to receive an edge of the glass panel and extend along an adjacent planar portion of the glass panel, the flange engaging channel and the window receiving channel being continuously curvilinear from a free end of the flange engaging channel to a free end of the window receiving channel, the backbone including an inflection point intermediate the flange engaging channel and the window receiving channel, and a sealing lip connected to the backbone and extending into the window receiving channel, the sealing lip having a different hardness than the backbone.

2. The vehicular weatherseal of claim 1, wherein the window channel closed end has an inner radius of curvature and a thickness, a ratio of the inner radius of curvature to the thickness of the window channel closed end being greater than approximately 1.

3. The vehicular weatherseal of claim 1, wherein the window channel closed end has an inner radius of curvature and a thickness, a ratio of the inner radius of curvature to the thickness of the window channel closed end being greater than approximately 1.5.

4. The vehicular weatherseal of claim 1, wherein the window channel closed end has an inner radius of curvature and a thickness, a ratio of the inner radius of curvature to the thickness of the window channel closed end being greater than approximately 2.5.

5. The vehicular weatherseal of claim 1, wherein the window channel closed end is defined by a varying radius of curvature.

6. The vehicular weatherseal of claim 5, wherein the window channel closed end is defined by a constant wall thickness.

7. The vehicular weatherseal of claim 1, wherein the window channel closed end has a constant radius of curvature.

8. The vehicular weatherseal of claim 1, wherein the flange engaging channel is defined in cross section by a transition leg, an interior leg and a flange channel closed end connecting the transition leg to the interior leg, the flange channel closed end being curvilinear.

9. The vehicular weatherseal of claim 8, wherein the flange channel closed end has an inner radius of curvature and a thickness, a ratio of the inner radius of curvature to the thickness being greater than approximately 1.

10. The vehicular weatherseal of claim 8, wherein the flange channel closed end has an inner radius of curvature and a thickness, a ratio of the inner radius of curvature to the thickness being greater than approximately 1.5.

11. The vehicular weatherseal of claim 8, wherein the flange channel closed end has an inner radius of curvature and a thickness, a ratio of the inner radius of curvature to the thickness being greater than approximately 2.5.

12. The vehicular weatherseal of claim 8, wherein the flange channel closed end is defined by a varying radius of curvature.

13. The vehicular weatherseal of claim 8, wherein the flange channel closed end is defined by a constant wall thickness.

14. The vehicular weatherseal of claim 8, wherein the flange channel closed end has a constant radius of curvature.

15. The vehicular weatherseal of claim 8, wherein the window channel closed end has a constant first radius of curvature and the flange channel closed end has a constant second radius of curvature.

16. The vehicular weatherseal of claim 8, wherein the window channel closed end has a first radius of curvature and the flange channel closed end has a different second radius of curvature.

17. The vehicular weatherseal of claim 1, wherein the polymeric backbone includes an elongation reducing member, the elongation reducing member increasing rigidity of the backbone in only a single dimension.

18. The vehicular weatherseal of claim 1, wherein the backbone has a hardness of at least 40 Shore D.

19. The vehicular weatherseal of claim 1, wherein the backbone is monolithic.

20. The vehicular weatherseal of claim 1, wherein the backbone is selected to provide an unsupported operable length of the weatherseal.

21. The vehicular weatherseal of claim 1, wherein a longitudinal axis of the backbone is adapted to extend about three mutually perpendicular axes.

22. The vehicular weatherseal of claim 1, wherein a radius of curvature of the window channel closed end is less than an arc length of the window channel closed end.

23. The vehicular weatherseal of claim 1, wherein the backbone includes a TPE.

24. The vehicular weatherseal of claim 1, wherein the window channel closed end is connected to an exterior leg and at least a portion of a transition leg.

25. The vehicular weatherseal of claim 1, wherein the backbone defines an S shape cross section.

26. The vehicular weatherseal of claim 1, further comprising an attachment tab connected to the polymeric backbone.

27. The vehicular weatherseal of claim 26, wherein the attachment tab is connected by one of bonding, thermal welding, chemical fusion and a mechanical fastener.

28. The vehicular weatherseal of claim 26, wherein the attachment tab is a polymeric material.

29. The vehicular weatherseal of claim 1, further comprising a first and a second attachment tab connected to the polymeric backbone.

* * * * *